US010346136B2

(12) United States Patent
Choi et al.

(10) Patent No.: US 10,346,136 B2
(45) Date of Patent: Jul. 9, 2019

(54) DEVICE AND METHOD FOR MANAGING PERFORMANCE OF QUANTUM NOISE-BASED RANDOM NUMBER GENERATOR

(71) Applicant: ID QUANTIQUE S.A., Carouge (CH)

(72) Inventors: Jeong Woon Choi, Seoul (KR); Seok Beom Cho, Seoul (KR)

(73) Assignee: ID QUANTIQUE S.A., Carouge (CH)

( * ) Notice: Subject to any disclaimer, the term of this patent is extended or adjusted under 35 U.S.C. 154(b) by 0 days.

(21) Appl. No.: 15/570,624

(22) PCT Filed: Dec. 19, 2016

(86) PCT No.: PCT/KR2016/014884
§ 371 (c)(1),
(2) Date: Oct. 30, 2017

(87) PCT Pub. No.: WO2017/116055
PCT Pub. Date: Jul. 6, 2017

(65) Prior Publication Data
US 2018/0260192 A1 Sep. 13, 2018

(30) Foreign Application Priority Data
Dec. 31, 2015 (KR) ........................ 10-2015-0190741

(51) Int. Cl.
G06F 7/58 (2006.01)
G01J 1/20 (2006.01)
H04L 9/08 (2006.01)

(52) U.S. Cl.
CPC ................ G06F 7/588 (2013.01); G01J 1/20 (2013.01); G06F 7/58 (2013.01); H04L 9/0869 (2013.01); H04L 2209/08 (2013.01)

(58) Field of Classification Search
None
See application file for complete search history.

(56) References Cited

U.S. PATENT DOCUMENTS 6,831,980 B1 12/2004 Borza et al.
2013/0110895 A1* 5/2013 Valentino ................ G06F 7/588
708/255

(Continued)

FOREIGN PATENT DOCUMENTS

KR 10-2002-0032331 A 5/2002
KR 10-2010-0104261 A 9/2010

(Continued)

OTHER PUBLICATIONS

International Search Report for PCT/KR2016/014884 dated Feb. 17, 2017.

(Continued)

Primary Examiner — David H Malzahn
(74) Attorney, Agent, or Firm — Hauptman Ham, LLP

(57) ABSTRACT

The present invention presents a device and method for managing the performance of a quantum noise-based random number generator, the device ensuring the performance stability of a random number generator on the basis of an output value for each pixel, which is outputted in correspondence to an optical strength value of an optical signal emitted from a light source and inputted into each pixel, so as to be capable of outputting, within a certain range regardless of devices, a value of an entropic signal outputted from an image sensor, thereby enabling sufficient randomness to be continuously maintained while minimizing deviation between pixels.

12 Claims, 5 Drawing Sheets

(56) References Cited

U.S. PATENT DOCUMENTS

2015/0019605 A1* 1/2015 Boehl .................. G06F 7/58
708/250
2017/0308358 A1* 10/2017 Haddad ................ G01J 1/44
2018/0260192 A1* 9/2018 Choi .................... G01J 1/20

FOREIGN PATENT DOCUMENTS

KR  10-2010-0118772 A  11/2010
KR  10-2015-0124405 A  11/2015

OTHER PUBLICATIONS

Bruno Sanguinetti et al., "Quantum Random Number Generation on a Mobile Phone", Physical Review X, Sep. 29, 2014, vol. 4, Issue 3, Article 031056, American Physical Society, US.

* cited by examiner

[Fig. 1]
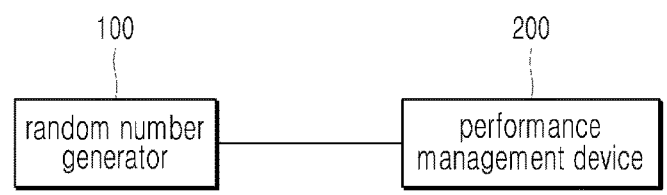

[Fig. 2]
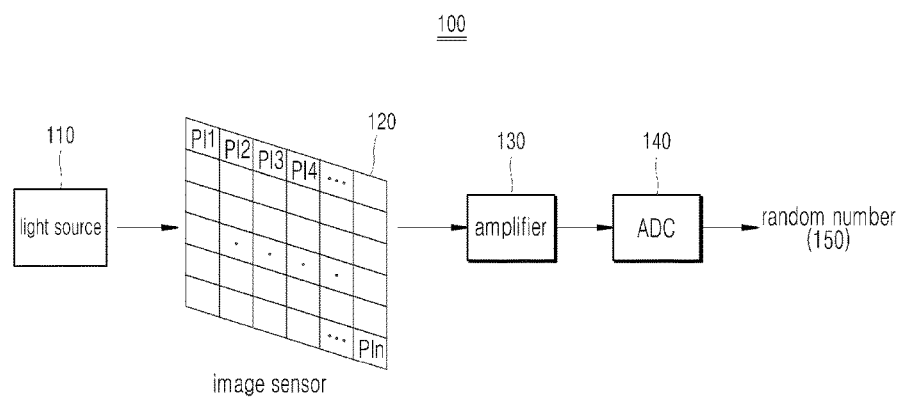

[Fig. 3]
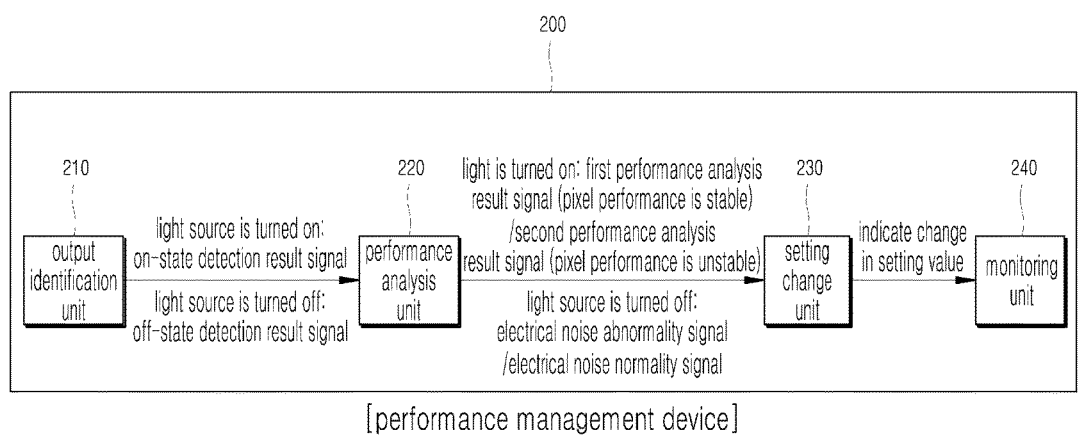

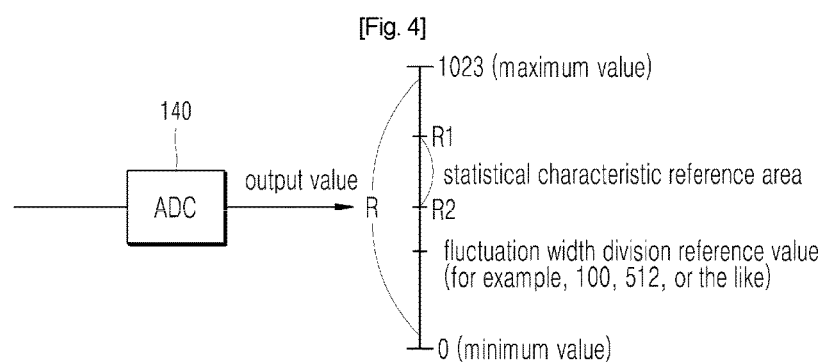

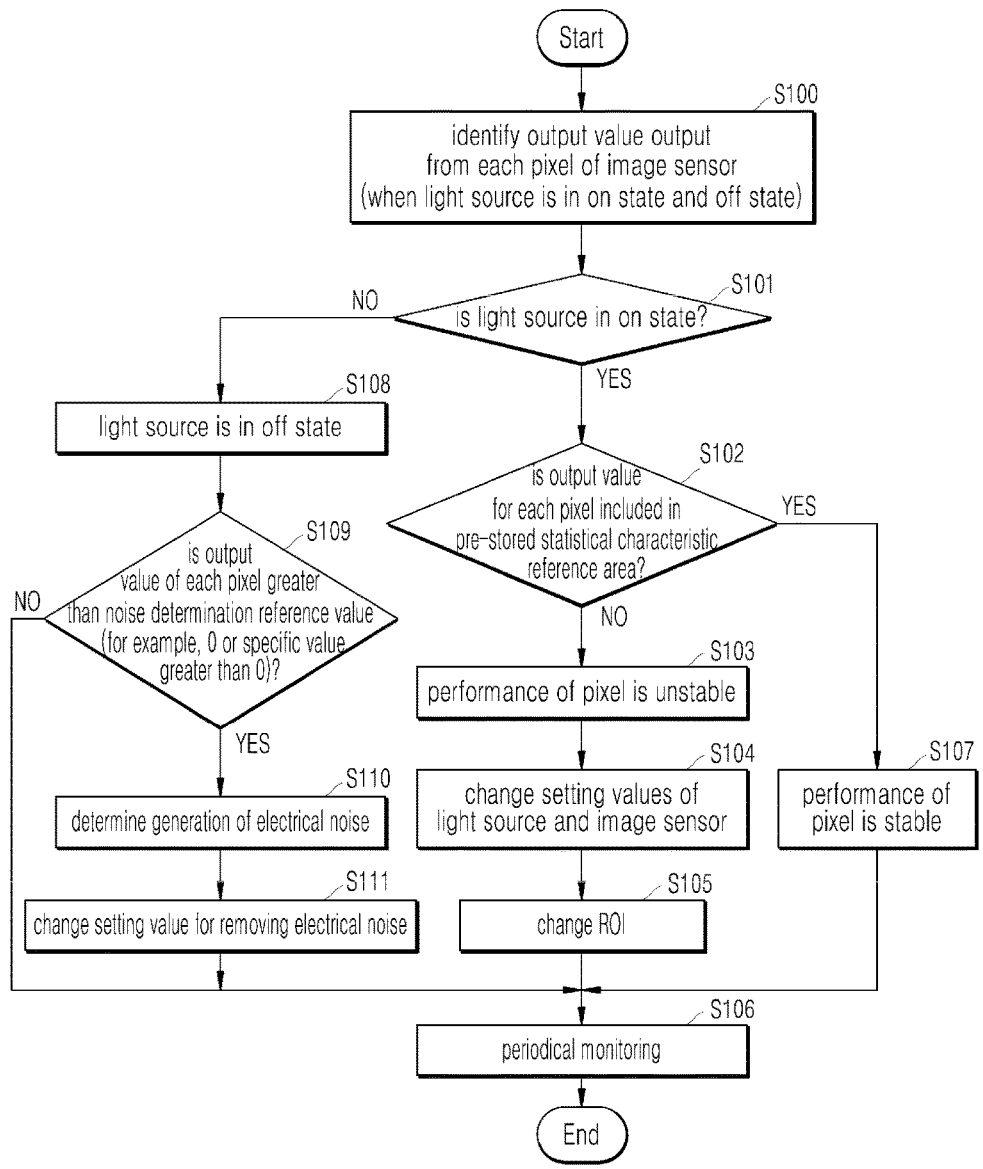
[Fig. 5]

DEVICE AND METHOD FOR MANAGING PERFORMANCE OF QUANTUM NOISE-BASED RANDOM NUMBER GENERATOR

CROSS REFERENCE TO RELATED APPLICATION

This present application is a national stage filing under 35 U.S.C § 371 of PCT application number PCT/KR2016/014884 filed on Dec. 19, 2016 which is based upon and claims the benefit of priority to Korean Patent Application No. 10-2015-0190741 filed on Dec. 31, 2015 in the Korean Intellectual Property Office. The disclosures of the above-listed applications are hereby incorporated by reference herein in their entirety.

BACKGROUND OF THE INVENTION

1. Field of the Invention

The present disclosure relates to technology for securing the performance reliability of a quantum-noise-based random number generator.

More particularly, the present disclosure relates to a method of securing the performance reliability of a random number generator based on an output value that is output from each pixel according to a light intensity value of a light signal input into each pixel.

2. Description of the Prior Art

A random number is used in various fields, such as those of security, scientific calculations, games, and lotteries, and in most cases, a pseudo-random number, generated based on an algorithm, is used instead of a true random number.

However, unlike the true random number, the pseudo-random number has a problem in that it may be predictable.

Recently, various researches on a true random number generator that generates a true random number, rather than a pseudo-random number, has been conducted, and particularly, a quantum random number generator that generates a true random number using a quantum phenomenon has been receiving attention.

One such quantum random number generator generates a true random number through shot noise or quantum shot noise which indicates uncertainty of the number of photons generated by a light source.

For implementing a shot-noise-based random number generator, technology using an image sensor such as a CMOS sensor or a CCD sensor has recently appeared (see thesis: physical Review X, 4, 031056 (2014)).

More specifically, the random number generator based on shot noise of light uses a light intensity value accumulated for a predetermined amount of time in each pixel as a random number. Fluctuation in the light intensity value gives rise to randomness.

Particularly, since the light intensity value accumulated for a predetermined amount of time in each pixel follows a Poisson distribution, a mean value and a variance value of the light intensity value have a linear proportional relationship therebetween. For this reason, variance to measure fluctuation is determined by a mean value, and then randomness in each pixel is determined based on a mean of the light intensity value.

Accordingly, entropy output from an image sensor is determined by a mean value of the light intensity value for each pixel according to a Poisson distribution, and the quality of randomness is determined based on the determined entropy.

That is, when the mean value of the light intensity value for each pixel increases, variance increases, fluctuation in the light intensity value for each pixel increases, entropy increases, and thus the quality of randomness is improved.

Meanwhile, when the mean value of the light intensity value for each pixel decreases, variance decreases, fluctuation in the light intensity value for each pixel decreases, entropy decreases, and thus the quality of randomness deteriorates.

Accordingly, the quantum shot-noise-based random number generator generates an entropic signal corresponding to entropy through a light source and an image sensor, and performs Random Number Generator (RNG) post-processing to generate a random number.

However, due to various causes such as characteristic differences that may be generated during a process of manufacturing the light source and image sensors (including difference in characteristics of the scheme or structure for implementing the random generator, the outside temperature, and supplied current), values of entropic signals from image sensor can be different even the same random generator modules, chips, or devices is used.

SUMMARY OF THE INVENTION

A technical problem to be solved by the present disclosure is to secure the performance reliability of a random number generator based on a pixel-specific output value output from each pixel according to a light intensity value of a light signal input into each pixel.

In accordance with an aspect of the present disclosure, an apparatus for managing the performance of a random number generator is provided. The apparatus includes: an output identification unit configured to, when a light signal radiated from at least one light source is input into an image sensor including at least one pixel, identify an output value output from each pixel corresponding to a light intensity value of a light signal input into each pixel; a performance analysis unit configured to analyze the performance of each pixel using the output value of each pixel and a preset statistical characteristic reference area; and a setting change unit configured to change a setting value for at least one of the light source and the image sensor based on a result of the analysis of the performance of each pixel.

Specifically, when the light source is in an on state and all or partial output values of each pixel are included in the statistical characteristic reference area, the performance analysis unit may determine that the performance of each pixel is stable and generate a first performance analysis result signal, whereas when all or partial output values of each pixel are not included in the statistical characteristic reference area, determine that the performance of each pixel is not stable and generate a second performance analysis result signal.

Specifically, when the second performance analysis result signal is generated, the setting change unit may change a first setting value related to the control of a light quantity or a light intensity of the light source to stabilize the performance of each pixel.

Specifically, when the second performance analysis result signal is generated, the setting change unit may change a second setting value related to the control of driving of each pixel within the image sensor to stabilize the performance of each pixel.

Specifically, when the second performance analysis result signal is generated and the uniformity of the light intensity value of the light signal input into each pixel is not included in a preset uniformity determination reference range, the setting change unit may change a third setting value related to the control of a Range Of Interest (ROI) of the image sensor.

Specifically, when the light source is in an off state and all or partial output values of each pixel are greater than a preset noise determination reference value, the performance analysis unit may determine that the electrical noise of each pixel is greater than or equal to a reference value, and the setting change unit may change a fourth setting value related to the electrical noise.

Specifically, the statistical characteristic reference area may be determined as a range greater than or equal to a preset fluctuation width division reference value among ranges corresponding to a fluctuation width of a light intensity value accumulated in each pixel for a predetermined amount of time following a Poisson distribution.

Specifically, the apparatus may further include a monitoring unit configured to monitor the quality of an output value output from each pixel after the setting value is changed.

In accordance with another aspect of the present disclosure, a method of operating an apparatus for managing the performance of a random number generator is provided. The method includes: an output identification step of identifying, when a light signal radiated from at least one light source is input into an image sensor including at least one pixel, an output value output from each pixel corresponding to a light intensity value of a light signal input into each pixel; a performance analysis step of analyzing the performance of each pixel using the output value of each pixel and a preset statistical characteristic reference area; and a setting change step of changing a setting value for at least one of the light source and the image sensor based on a result of the analysis of the performance of each pixel.

Specifically, the setting change step may include performing at least one of the steps of: when the light source is in an on state and all or partial output values of each pixel are not included in the statistical characteristic reference area, changing a first setting value related to the control of a light quantity or a light intensity of the light source; changing a second setting value related to the control of driving of each pixel within the image sensor; and changing a third setting value related to the control of a Range Of Interest (ROI) of the image sensor.

Specifically, the statistical characteristic reference area may be determined as a range greater than or equal to a preset fluctuation width division reference value among ranges corresponding to a fluctuation width of a light intensity value accumulated in each pixel for a predetermined amount of time following a Poisson distribution.

Specifically, the method may further include a monitoring step of monitoring the quality of an output value output from each pixel after the setting value is changed.

Accordingly, the present disclosure achieves an effect of consistently securing sufficient randomness while minimizing deviation between pixels by securing the performance reliability of the random number generator based on the output value for each pixel output in accordance with the light intensity value of the light signal radiated from the light source and input into each pixel.

BRIEF DESCRIPTION OF THE DRAWINGS

FIG. 1 illustrates an example of a communication environment to which a performance management device that manages the performance of a quantum-noise-based random number generator is applied according to an embodiment of the present disclosure;

FIG. 2 illustrates the basic concept of the random number generator;

FIG. 3 is a block diagram illustrating the configuration of a performance management device according to an embodiment of the present disclosure;

FIG. 4 illustrates an example of a statistical characteristic reference area according to an embodiment of the present disclosure; and FIG. 5 is a flowchart illustrating the operation flow for securing the performance reliability of the random number generator in the performance management device according to an embodiment of the present disclosure.

DETAILED DESCRIPTION OF THE EXEMPLARY EMBODIMENTS

It should be noted that the technical terms as used herein are merely used for describing particular embodiments, and are not intended to limit the scope of the present disclosure. Further, the technical terms in the specification should be construed as a meaning generally understood by those skilled in the art unless the terms are defined as another meaning and should not be construed as an excessively inclusive meaning or an excessively exclusive meaning. When a technical term used in the specification is an incorrect technical term which does not accurately express the idea of the present disclosure, the technical term should be replaced with the correct technical term which can be understood by those skilled in the art. Further, the general terms used in the present disclosure should be interpreted in the context according to the dictionary definition and should not be construed as possessing an excessively limited meaning.

In addition, a singular expression used in the specification includes a plural expression as long as they are clearly distinguished in the context. In the present disclosure, the term "comprise" or "include" should not be construed as necessarily including all of various elements or various steps disclosed herein, and it should be understood that some of the elements or steps may not be included, or additional elements or steps may be further included.

In addition, although terms including ordinal numbers such as first, second, and the like may be used to describe various elements, the elements should not be restricted by the terms. The terms are used merely for the purpose to distinguish an element from the other elements. For example, a first element may be termed a second element, and similarly, a second element may be termed a first element without departing from the scope of the present disclosure.

Hereinafter, embodiments of the present disclosure will be described in detail with reference to the accompanying drawings, equal or similar elements are assigned an equal reference numeral, and an overlapping description thereof will be omitted.

Further, in the following description of the technology of the present disclosure, a detailed description of known technologies incorporated herein will be omitted when it may make the subject matter of the present disclosure rather unclear. Further, it should be noted that the accompanying drawings are intended only for the easy understanding of the technical idea of the present disclosure, and the technical idea should not be construed as being limited by the accompanying drawings.

Hereinafter, embodiments of the present disclosure will be described in detail with reference to the accompanying drawings. In adding reference numerals to elements in each drawing, the same elements will be designated by the same reference numerals, if possible, although they are shown in different drawings. Further, in the following description of the present disclosure, a detailed description of known functions and configurations incorporated herein will be omitted when it is determined that the description may make the subject matter of the present disclosure rather unclear.

Hereinafter, an embodiment of the present disclosure will be described with reference to the accompanying drawings.

FIG. 1 illustrates an example of an environment to which a performance management device for managing the performance of a quantum-noise-based random number generator according to an embodiment of the present disclosure is applied.

A random number generator 100 detects a light intensity value of a light signal radiated from a light source and input into each pixel for a predetermined time and generates a true random number (hereinafter, referred to simply as a "random number") based on shot noise or quantum shot noise for the detected light quantity.

The random number generator 100 may be a Quantum Random Number Generator (QRNG) based on quantum noise, and may be implemented in a device, module, or chip form.

At this time, at least one light source may be provided depending on the size and performance of the random number generator 100, and the number of light sources is not limited. However, the following description will be made based on one light source for convenience of description.

A performance management device 200 is a device for securing the performance reliability of the random number generator 100, and particularly, analyzes the performance for each pixel based on an ADC output value (hereinafter, referred to as an "output value") for each pixel. The ADC output is an output corresponding to the light intensity value of the light signal radiated from the light source and input into each pixel.

The performance management device 200 controls the setting of at least one of a light source and an image sensor or changes a Range Of Interest (ROI) within the image sensor based on a result of the analysis of the performance for each pixel, so that the performance reliability of the random generator 100 is secured and monitored.

To this end, the performance management device 200 may identify input and output signals of elements (for example, a light source, an image sensor, and an ADC) within the random number generator 100, and may control setting values of the elements (for example, the light source, the image sensor, and the ADC). The details will be described below.

The performance management device 200 may be mounted within the random number generator 100 as a single function block. Alternatively, the performance management device 200 may be implemented as a separate device and may secure and monitor the performance reliability of the random number generator 100.

Hereinafter, the basic structure of the random number generator 100 will be briefly described.

As illustrated in FIG. 2, the random number generator 100 detects a light quantity, that is, a light intensity value of a light signal radiated from a light source 110 and input into each pixel of an image sensor 120 for a predetermined time, and generates a true random number (hereinafter, referred to as a random number) based on shot noise or quantum shot noise for the detected light quantity. The random number generator 100 may be implemented in an equipment, module, or chip form.

The random number generator 100 may include the light source 110, the image sensor 120, an amplifier 130, and an Analog-Digital Converter (ADC) 140.

The light source 110 may radiate photons, and, for example, may successively radiate a light signal including a plurality of photons.

The light source 110 may radiate coherent light such as that from a laser or chaotic light such as that from a Light-Emitting Diode (LED). When an LED is used as the light source 110, a suitable current may be applied within a threshold range set to maintain a quantum noise characteristic.

The image sensor 120 may be a camera module equipped with the image sensor 120 and may transfer a current/voltage accumulated at specific time unit to an amplifier 130 to generate a random number 150 based on quantum noise of the detected light quantity.

At this time, the image sensor 120 may be implemented as a Complementary Metal Oxide Semiconductor (CMOS) sensor or a Charge-Coupled Device (CCD) sensor, or may be implemented as another similar sensor that may detect a light signal radiated from the light source 110.

The image sensor 120 may include at least one pixel (PI1 to PIn), and each pixel may be controlled according to a control signal.

The amplifier 130 amplifies the current/voltage input from the image sensor 120 and then transmits the amplified current/voltage to the ADC 140.

When the amplified current/voltage is received as an analog signal, the ADC 140 converts the received analog signal into a digital signal and generates the random number 150.

It is noted that similar technology related to the aforementioned structure of the random number generator 100 has already been disclosed in Physical Review X, 4, 031056 (2014).

When the random number 150 is generated through the random number generator 100, the light intensity value accumulated in each pixel of the image sensor 120 for a predetermined amount of time follows a Poisson distribution. A mean value and a variance value of the light intensity value have the linear proportional relationship shown in Equation (1).

$$m = \sigma^2 \qquad \text{Equation (1)}$$

In Equation (1), m denotes a mean value of the light intensity value, and $\sigma^2$ denotes variance.

For this reason, variance to measure fluctuation in the light intensity value is determined by the mean value, and then, randomness in each pixel of the image sensor 120 is determined by the mean value of the light intensity value.

Accordingly, the entropy of the output from the image sensor 120 is determined based on the mean value of the light intensity value for each pixel according to a Poisson distribution, and the quality of randomness is determined based on the determined entropy.

That is, when the mean value of the light intensity value for each pixel increases, variance increases, fluctuation in the light intensity value for each pixel increases, entropy increases, and thus the quality of randomness is improved.

Meanwhile, when the mean value of the light intensity value for each pixel decreases, variance decreases, fluctuation in the light intensity value for each pixel decreases, entropy decreases, and thus the quality of randomness deteriorates.

The random number generator 100 generates an entropic signal corresponding to entropy using the light source 110 and the image sensor 120, and performs Random Number Generator (RNG) post-processing to generate the random number 150.

However, due to various causes such as a characteristic difference that may be generated during a process of manufacturing the light source 110 and image sensors 120 (including difference in characteristics of the scheme or structure for implementing the random number generator 100, the outside temperature, and the supplied current), values of entropic signals output from the image sensor 120 can be different even though the same random generator modules, chips, or devices is used. As a result, the quality of the ultimately output random number varies.

In order to solve this problem, it is important to maintain a value of the entropic signal output from the image sensor 120 within a predetermined range regardless of the device, to make each pixel of the image sensor 120 secure sufficient randomness, to minimize deviation between pixels, and to consistently secure sufficient randomness as long as the light source 100 remains in an on state.

Accordingly, the present disclosure proposes a scheme for securing reliability of the output quality of the random number generator 100 even when different random number generators are influenced by various performance reliability deterioration causes by controlling states of the light source 110 and the image sensor 120 and performing periodic monitoring/control.

Hereinafter, the configuration of the performance management device 200 according to an embodiment of the present disclosure to secure the performance reliability of the random number generator 100 will be described with reference to FIG. 3.

As illustrated in FIG. 3, the performance management device 200 according to an embodiment of the present disclosure may have a configuration including an output identification unit 210 for identifying, when a light signal radiated from the light source 110 is input into the image sensor 120 including at least one pixel, an output value output from each pixel corresponding to a light intensity value of a light signal input into each pixel, a performance analysis unit 220 for analyzing the performance of each pixel based on the output value of each pixel and a preset statistical characteristic reference area, a setting change unit 230 for changing a setting value to control at least one of the light source 110 and the image sensor 120 based on a result of the analysis of the performance of each pixel, and a monitoring unit 240 for monitoring the output quality of each pixel after the setting value is changed.

All or at least a part of the total configuration of the performance management device 200, including the output identification unit 210, the performance analysis unit 220, the setting change unit 230, and the monitoring unit 240, may be implemented in the form of a software module, a hardware module, or a combination of the software module and the hardware module.

As a result, the performance management device 200 according to an embodiment of the present disclosure may secure the performance reliability of the random number generator based on the output value for each pixel, output in accordance with the light intensity value of the light signal that is radiated from the light source 110 and input into each pixel of the image sensor 120 through the above elements, and thus a value of the entropic signal output from the image sensor 120 may be output within a predetermined range regardless of the device, and accordingly, sufficient randomness can be consistently secured while deviation between pixels is minimized. Hereinafter, each element within the performance management device 200 will be described in detail.

The output identification unit 210 identifies the output value of each pixel output in accordance with the light intensity value of the light signal input into each pixel of the image sensor 120.

More specifically, the output identification unit 210 identifies whether the light source 110 is in an on state or an off state and then detects the output value of each pixel of the image sensor 120 in the current state.

Here, the output value of each pixel may be output as a parallel output, such as 8 bits, 10 bits, or 16 bits per image sensor 120, or a serial output.

Regardless of whether the output value of each pixel corresponds to parallel output or serial output, the output value is finally analyzed as a digital value in a predetermined range.

For example, when the output of each pixel is 10 bits, the output value analyzed as a digital value through the ADC 140 has a value between 0 and 1023.

When the output value of each pixel is detected, the output identification unit 210 may identify all output values of all pixels of the image sensor 120 or may identify only some of the pixels (for example, at regular intervals or according to a particular pattern) to reduce the time according to settings made by an operator. Hereinafter, for convenience of description, it is assumed that output values of all pixels of the image sensor 120 are identified.

Thereafter, the output identification unit 210 generates a detection result signal for indicating the result of the detection of the output value of each pixel of the image sensor 120.

That is, when the light source 110 is currently in the on state, the output identification unit 210 detects the output value of each pixel of the image sensor 120 and then generates an on-state detection result signal including the detected output value of each pixel.

Here, the on-state detection result signal may include the output value of each pixel, detected when the light source is in the on state, and an identifier for identifying that the light source is in the on state.

Meanwhile, when the light source 110 is in the off state, the output identification unit 210 detects the output value of each pixel of the image sensor 120 and then generates an off-state detection result signal including the detected output value of each pixel.

Here, the off-state detection result signal may include the output value of each pixel, detected when the light source is in the off state, and an identifier for identifying that the light source is in the off state.

When the detection result signal according to the on/off state of the light source is generated, the output identification unit 210 transmits the detection result signal to the performance analysis unit 220.

The performance analysis unit 220 analyzes the performance of each pixel based on the output value of each pixel and a preset statistical characteristic reference area.

More specifically, the performance analysis unit 220 analyzes the performance of each pixel according to the on/off state of the light source 110 based on the detection result signal received from the output identification unit 210.

First, a process of analyzing the performance of each pixel when the light source 110 is in the on state will be described.

When the on-state detection result signal is received from the output identification unit 210, the performance analysis unit 220 determines that the light source 110 is currently in the on state. Subsequently, the performance analysis unit 220 identifies, from the on-state detection result signal, the output value of each pixel detected when the light source is in the on state.

Thereafter, the performance analysis unit 220 generates a performance result based on the result of a comparison between the output value of each pixel and the preset statistical characteristic reference area.

At this time, all output values of all pixels of the image sensor 120 may be compared with the preset statistical characteristic reference area or only some of the pixels (for example, at regular intervals or according to a particular pattern) may be compared according to settings made by the operator. Hereinafter, for convenience of description, the following description will be made based on the assumption that the output values of the respective pixels of the image sensors 120 are all compared with the preset statistical characteristic reference area.

Here, the statistical characteristic reference area may be a reference range for identifying whether the output value of each pixel is distributed in an area in which a statistical characteristic of quantum shot noise is maintained or whether there is sufficient fluctuation.

The statistical characteristic reference area is set as an area having a value as large as possible within an interval (hereinafter, referred to as a statistical characteristic maintenance interval) in which a statistical characteristic of quantum shot noise is maintained to secure excellent randomness and having a large width of fluctuation in a light intensity value for each pixel, but it is preferable to exclude an interval that is saturated or exceeds a quantum shot noise characteristic.

In connection this, FIG. 4 illustrates an example of the statistical characteristic reference area according to an embodiment of the present disclosure. In FIG. 4, the case where the output value of the ADC 140 of the image sensor 120 corresponds to 10 bits is described.

As illustrated in FIG. 4, when the output of the image sensor 120 corresponds to 10 bits, the statistical characteristic reference area according to an embodiment of the present disclosure may be determined within a range (0 to 1023) of output values available when a width of fluctuation in the light intensity value accumulated in each pixel for a predetermined amount of time is interpreted as a digital value, and a statistical characteristic of quantum shot noise may be maintained in a portion or all of the reference area. In order to identify such a characteristic maintenance interval, a separate additional statistical analysis module may be included.

The statistical characteristic reference area is determined as an interval having a fluctuation width as large as possible within a characteristic maintenance interval (R) between the minimum value (for example, 0) and the maximum value (for example, 1023). The characteristic maintenance interval (R) may be determined by an as large as possible range where the light intensity values accumulated in each pixel for a predetermined period follow the Poisson distribution.

That is, the statistical characteristic reference area is determined as an interval (R2, R1) corresponding to equal or greater than a fluctuation width division reference value (for example, 100, 512, or the like) within the characteristic maintenance interval (R).

Here, the statistical characteristic reference area may be determined by various methods depending on the characteristics of the random number generator.

For example, the fluctuation width division reference value (for example, 100, 512, or the like) may be set first for each of an area having a large fluctuation width and an area having a small fluctuation width, and then the statistical characteristic reference area (R2, R1) may be determined within the area having the large fluctuation width, that is, the area between a large output value (maximum value (for example, 1023) and fluctuation width division reference value (for example, 100, 512, or the like)).

Accordingly, the performance analysis unit 220 may compare the output value of each pixel converted into the digital value with the preset statistical characteristic reference area, and determine the performance reliability of the corresponding pixel.

That is, when the output value of each pixel (or any value representing the characteristic of the output value, such as the mean of output values) is included in the preset statistical characteristic reference area, the performance analysis unit 220 determines that the performance of each pixel is stable and generates a first performance analysis result signal.

Further, when the output value of each pixel (or any value representing the characteristic of the output value, such as the mean of output values) is not included in the preset statistical characteristic reference area, the performance analysis unit 220 determines that the performance of each pixel is not stable and generates a second performance analysis result signal. The second performance analysis result signal may include reference data for changing the setting value by the setting change unit 230.

In the present disclosure, the first performance analysis result signal is generated when it is determined that the performance of each pixel is stable, and the second performance analysis result signal is generated and transmitted when it is determined that the performance of each pixel is not stable.

However, the present disclosure is not limited thereto, and various signal processing schemes may be used. For example, a separate signal related to a setting value change is generated and transmitted when the performance is not stable, but a separate signal is not generated and transmitted when the performance of each pixel is stable.

Next, a process of analyzing the performance of each pixel when the light source 110 is in the off state will be described.

When the off-state detection result signal is received from the output identification unit 210, the performance analysis unit 220 determines that the light source 110 is currently in the off state. Subsequently, the performance analysis unit 220 identifies, from the off-state detection result signal, the output value of each pixel, which is detected when the light source 110 is in the off state.

Thereafter, the performance analysis unit 220 identifies whether the output value of each pixel is greater than a preset noise determination reference value (for example, 0 or a specific value greater than 0).

That is, when the output value of each pixel is greater than the noise determination reference value in the off state of the light source 110, the performance analysis unit 220 determines that the electrical noise of the image sensor 120 is greater than or equal to a reference value. Further, the performance analysis unit 220 generates an electrical noise abnormality signal to change the setting value for removing electrical noise and transmits the generated electrical noise abnormality signal to the setting change unit 230.

The electrical noise abnormality signal may include reference data for changing the setting value by the setting change unit 230.

Here, the noise determination reference value is a reference value set to determine whether electrical noise is generated and it may have different values according to settings made by the operator.

Meanwhile, when the output value of each pixel is smaller than the noise determination reference value in the off state of the light source 110, the performance analysis unit 220 determines that electrical noise of the image sensor 120 is smaller than a reference value, and thus generates an electrical noise normality signal to indicate that the electrical noise is included in a normal range and transmits the generated electrical noise normality signal to the setting change unit 230.

In the present disclosure, the electrical noise abnormality signal is generated when the output value of each pixel is greater than the preset noise determination reference value, and the electrical noise normality signal is generated and transmitted when the output value of each pixel is smaller than the noise determination reference value.

However, the present disclosure is not limited thereto, and various signal processing schemes may be used. For example, a separate signal related to a setting value change may be generated and transmitted when it is determined that electrical noise is generated, but a separate signal may not be generated and transmitted when the electrical noise falls within the normal range.

Meanwhile, the setting change unit 230 changes the setting value to control at least one of the light source 110 and the image sensor 120 based on a result of analysis of the performance of each pixel.

First, a process of changing the setting value based on the result of analysis of the performance of each pixel when the light source 110 is in the on state will be described.

More specifically, when the second performance analysis result signal is received from the performance analysis unit 220, it means that the performance of each pixel is not stable in the on state of the light source 110, and thus the setting change unit 230 changes the setting value for controlling the state of at least one of the light source 110 and the image sensor 120.

At this time, in order to control the state of at least one of the light source 110 and the image sensor 120, the setting change unit 230 may change a register value of each component within the light source 110 and the image sensor 120, or may change a setting value for controlling the actually applied voltage or current.

Hereinafter, the following description will be made based on the change in the setting value of at least one of the light source 110 and the image sensor 120.

First, when the state of the light source 110 is controlled, the setting change unit 230 changes a current or a voltage applied to the light source 110 by changing a first setting value related to the control of a light quantity or a light intensity of the light source 110 to stabilize the performance of each pixel.

Here, the first setting value is not limited to a setting value of a specific component for controlling the current or the voltage, and may be setting values for all components that may control the light quantity of the light source 110 within the random number generator 100.

That is, the setting change unit 230 controls the first setting value to increase the current or the voltage applied to the light source 110 when the output value of each pixel is formed to be generally low, and inversely controls the first setting value to decrease the current or the voltage applied to the light source 110 when the output value of each pixel is formed to be high.

Next, when the state of the image sensor 120 is controlled, the setting change unit 230 may generate as much fluctuation as desired by changing a second setting value related to the control of driving of each pixel within the image sensor 120 to stabilize the performance of each pixel.

Here, the second setting value may include a driving control parameter for controlling the sensitivity of each pixel, such as an analog gain or an exposure time of the image sensor 120, but is not limited thereto, and may include other parameters that may cause fluctuation in the output value of the pixel included in a desired area among a plurality of pixels included in the image sensor 120.

In most cases, changing and controlling the first setting value related to the control of the current or the voltage of the light source 110 may be preferentially performed.

Meanwhile, when the uniformity of the light intensity value of the light signal input into each pixel is not included in a preset uniformity determination reference range even though the state of the image sensor 120 is controlled, the setting change unit 230 may determine that the light intensity value of the light signal input into each pixel is not as uniform as desired, and thus may change the third setting value related to the control of the Range Of Interest (ROI) of the image sensor 120 and select and use only a particular area in which the light intensity value of the light signal is uniformly input.

Here, the third setting value may include all parameters (for example, start position setting, length setting, and the like) for selecting only a particular area that the user desires, among all areas within the image sensor 120. The uniformity determination reference range is a reference value to determine the degree of uniformity of the light intensity value of the light signal input into each pixel, and it may have different values according to settings made by the operator.

At this time, the Range Of Interest (ROI) may be changed by designating a horizontal start position, a vertical start position, a horizontal length, and a vertical length, which may define the particular area in which the light intensity value of the light signal is uniformly input. The Range Of Interest (ROI) may be generally changed by controlling a register value of the image sensor 120.

As a result, the setting change unit 230 identifies output values of pixels arranged at regular intervals or in a pattern among a plurality of pixels of the image sensor 120 and determines the particular area including a pixel in which the light intensity value of the light signal is uniformly input.

Thereafter, the setting change unit 230 determines the particular area within the image sensor 120 as areas to be used, determines the remaining areas except for the particular area as areas to be abandoned, and then determines the particular area to be the ROI.

As described above, the aforementioned method is generally used as a method of determining the ROI, but there may be some limiting factors in designating the start position or the length. Accordingly, in some cases, a plurality of areas may be designated, or shapes other than a rectangle may be used.

Next, a process of changing the setting value based on a result of the analysis of the performance of each pixel in the off state of the light source 110 will be described.

More specifically, when the electrical noise abnormality signal is received from the performance analysis unit 220, it means that the electrical noise is greater than or equal to a reference value in the off state of the light source 110, and thus the setting change unit 230 changes a fourth setting value related to the electrical noise.

Here, the fourth setting value may include an offset value, an analog gain, and an exposure time of the image sensor 120, but is not limited thereto, and may include other parameters that may remove electrical noise.

After the setting value is changed to control at least one of the light source 110 and the image sensor 120, the monitoring unit 240 performs a function of monitoring the quality of the output value of each pixel.

More specifically, when the setting value of at least one of the light source 110 and the image sensor 120 is completely changed, the monitoring unit 240 performs periodic monitoring and additional control according to the periodic monitoring.

Here, the monitoring interval may be set based on various units, such as 1 msec, 1 second, 1 minute, and the like, according to the characteristics of hardware.

As described above, when the output value of each pixel falls outside of a desired area based on the result of the periodic state monitoring, and particularly, when the output value of each pixel falls outside of the desired area a couple of times repeatedly by a predetermined amount or higher, the monitoring unit 240 generates a warning signal to indicate that the setting value of at least one of the light source 110 and the image sensor 120 should be changed again.

When the warning signal is repeatedly generated at short intervals, the operation of the random number generator 100 may be paused, and warm booting or cold booting may be performed.

Meanwhile, even when the output value of each pixel is in the desired area based on the periodic state monitoring, if a device (for example, test module) for testing the quality of the output value of each pixel discovers an unusual sign, the monitoring unit 240 generates the warning signal and performs control to again change the setting value of at least one of the light source 110 and the image sensor 120.

Of course, the aforementioned performance analysis, setting change, and monitoring functions may be used for, when the random number generator is first booted, maintaining the initial light intensity state close to a stable value (for example, an intermediate value 512) within the statistical characteristic reference area.

Hereinafter, the operation flow of securing the performance reliability of the random number generator 100 in the performance management device 200 according to an embodiment of the present disclosure will be described with reference to FIG. 5. For the convenience of description, the reference numerals of FIGS. 1 to 4 will be used. The operation flow of securing the performance reliability of the random number generator 100 described in FIG. 5 may be used in its entirety or partially according to a selection made by the operator.

First, the output identification unit 210 identifies an output value of each pixel output in accordance with a light intensity value of a light signal input into each pixel of the image sensor 120 in S100.

That is, the output identification unit 210 identifies whether the light source 110 is in an on state or an off state and then detects the output value of each pixel of the image sensor 120 in the current state.

As a result, the output identification unit 210 detects the output value of each pixel of the image sensor 120 and then generates an on-state detection result signal including the detected output value of each pixel when the light source 110 is currently in the on state, and detects the output value of each pixel of the image sensor 120 and then generates an off-state detection result signal including the detected output value of each pixel when the light source 110 is currently in the off state.

Thereafter, the output identification unit 210 transmits the detection result signal to the performance analysis unit 220.

The performance analysis unit 220 determines whether the light source 110 is in the on state based on the detection result signal in S101.

When the detection result signal corresponds to the on-state detection result signal based on the result of the determination of step S101, the performance analysis unit 220 determines that the light source 110 is currently in the on state and identifies the output value of each pixel detected when the light source is in the on state.

Thereafter, the performance analysis unit 220 determines whether the output value of each pixel is included in a preset statistical characteristic reference area in S102.

Here, the statistical characteristic reference area may be a reference range for identifying whether the output value of each pixel is distributed in an area in which a statistical characteristic of quantum shot noise is maintained or whether there is sufficient fluctuation.

When the output value of each pixel is not included in the preset statistical characteristic reference area based on the result of the determination of step S102, the performance analysis unit 220 determines that the performance of each pixel is not stable, and thus generates a second performance analysis result signal and transmits the generated second performance analysis result signal to the setting change unit 230 in S103. The second performance analysis result signal may include reference data for changing the setting value by the setting change unit 230.

When the second performance analysis result signal is received from the performance analysis unit 220, it means that the performance of each pixel is not stable in the on state of the light source 110, and thus the setting change unit 230 changes a setting value to control the state of at least one of the light source 110 and the image sensor 120 in S104.

First, when the state of the light source 110 is controlled, the setting change unit 230 changes an amount of current or voltage applied to the light source 110 by changing a first setting value related to the control of a light quantity or a light intensity of the light source 110 to stabilize the performance of each pixel.

Here, the first setting value is not limited to a setting value of a specific component for controlling the current amount or the voltage amount, and may be setting values for all components that may control the light quantity of the light source 110 within the random number generator 100.

That is, the setting change unit 230 controls the first setting value to increase the current amount or the voltage amount applied to the light source 110 when the output value of each pixel is formed to be generally low, and conversely controls the first setting value to decrease the current amount or the voltage amount applied to the light source 110 when the output value of each pixel is formed to be high.

Next, when the state of the image sensor 120 is controlled, the setting change unit 230 may generate as much fluctuation as desired by changing a second setting value related to the control of driving of each pixel within the image sensor 120 to stabilize the performance of each pixel.

Here, the second setting value may include a driving control parameter for controlling the sensitivity of each pixel, such as an analog gain or an exposure time of the image sensor 120, but is not limited thereto, and may include other parameters that output fluctuation in the output value of the pixel included in a desired area, among the plurality of pixels included in the image sensor 120.

Meanwhile, when the uniformity of the light intensity value of the light signal input into each pixel does not fall within a preset uniformity determination reference range even though the state of the image sensor 120 is controlled, the setting change unit 230 may determine that the light intensity value of the light signal input into each pixel is not as uniform as desired, and thus may change the third setting value related to the control of the Range Of Interest (ROI) of the image sensor 120 and select and use only a particular area, in which the light intensity value of the light signal is uniformly input in S105.

Here, the third setting value may include all parameters (for example, start position setting, length setting, and the like) for selecting only a particular area that the user desires, among all areas within the image sensor 120.

As a result, the setting change unit 230 identifies output values of pixels arranged at regular intervals or in a pattern among a plurality of pixels of the image sensor 120 and determines an area including a pixel in which the light intensity value of the light signal is uniformly input as the particular area.

Thereafter, the setting change unit 230 determines the particular area within the image sensor 120 as areas to be used, determines the areas other than the particular area as areas to be abandoned, and then determines the particular area as the ROI.

Meanwhile, the monitoring unit 240 performs a function of monitoring the quality of the output value of each pixel after the setting value is changed to control at least one of the light source 110 and the image sensor 120 or the Range Of Interest (ROI) is controlled in S106.

When the output value of each pixel is included in the present statistical characteristic reference area based on a result of the determination of step S102, the performance analysis unit 220 determines that the performance of each pixel is stable in S107, and then the monitoring unit 240 performs a periodic state monitoring process of step S106.

Meanwhile, when the detection result signal corresponds to the off-state detection result signal based on a result of the determination of step S101, the performance analysis unit 220 determines that the light source 110 is currently in the off state and identifies the output value of each pixel detected when the light source is in the off state in S108.

Thereafter, the performance analysis unit 220 identifies whether the output value of each pixel is greater than a preset noise determination reference value (for example, 0 or a specific value greater than 0) in S109.

When the output value of each pixel is greater than the noise determination reference value in the off state of the light source 110 based on the result of the determination of step S109, the performance analysis unit 220 determines that the amount of electrical noise of the image sensor 120 is greater than or equal to a reference value, and thus generates an electrical noise abnormality signal to change the setting value for removing the electrical noise and transmits the generated electrical noise abnormality signal to the setting change unit 230 in S110.

The electrical noise abnormality signal may include reference data for changing the setting value by the setting change unit 230.

When the electrical noise abnormality signal is received from the performance analysis unit 220, it means that the amount of electrical noise is greater than or equal to a reference value in the off state of the light source 110 and thus the setting change unit 230 changes a fourth setting value related to the electrical noise in S111.

Here, the fourth setting value may include an offset value, an analog gain, and an exposure time of the image sensor 120, but is not limited thereto, and may include other parameters that may remove electrical noise.

Meanwhile, when the output value of each pixel is smaller than the noise determination reference value in the off state of the light source 110 based on a result of the determination of step S109, it is determined that the electrical noise of the image sensor 120 is equal to or smaller than a reference value and is included in the normal range, and then the periodic state monitoring process of step S106 is performed by the monitoring unit 240.

The operation flow of securing the performance reliability of the random number generator 100 according to an embodiment of the present disclosure can be used for securing quality reliability in quality tests during manufacturing QRNG and its driving, but is not limited thereto, and can be applied to all steps (for example, steps before release) related to securing the performance reliability of QRNG.

As described above, according to an embodiment of the present disclosure, it is possible to output a value of an entropic signal output from an image sensor within a predetermined range regardless of the kind of device by securing the performance reliability of the random number generator based on an output value for each pixel, output in accordance with a light intensity value of a light signal radiated from a light source and input into each pixel, thereby achieving an effect of consistently securing sufficient randomness while minimizing deviation between pixels.

The implementations of the functional operations and subject matter described in the present disclosure may be realized by a digital electronic circuit, by the structure described in the present disclosure and the equivalent including computer software, firmware, or hardware including, or by a combination of one or more thereof. Implementations of the subject matter described in the specification may be implemented in one or more computer program products, that is, one or more modules related to a computer program command encoded on a tangible program storage medium to control an operation of a processing system or the execution by the operation.

A computer-readable medium may be a machine-readable storage device, a machine-readable storage substrate, a memory device, a composition of materials influencing a machine-readable radio wave signal, or a combination of one or more thereof.

In the specification, the term "system" or "device", for example, covers a programmable processor, a computer, or all kinds of mechanisms, devices, and machines for data processing, including a multiprocessor and a computer. The processing system may include, in addition to hardware, a code that creates an execution environment for a computer program when requested, such as a code that constitutes processor firmware, a protocol stack, a database management system, an operating system, or a combination of one or more thereof.

A computer program (also known as a program, software, software application, script, or code) can be written in any form of programming language, including compiled or interpreted languages, declarative or procedural languages, and it can be deployed in any form, including as a stand-alone program or module, a component, subroutine, or another unit suitable for use in a computer environment. A computer program may, but need not, correspond to a file in a file system. A program can be stored in a single file provided to the requested program, in multiple coordinated files (for example, files that store one or more modules, sub-programs, or portions of code), or in a portion of a file that holds other programs or data (for example, one or more scripts stored in a markup language document). A computer program can be deployed to be executed on one computer or on multiple computers that are located at one site or distributed across a plurality of sites and interconnected by a communication network.

A computer-readable medium suitable for storing a computer program command and data includes all types of non-volatile memories, media, and memory devices, for example, a semiconductor memory device such as an EPROM, an EEPROM, and a flash memory device, and a magnetic disk such as an external hard disk or an external disk, a magneto-optical disk, a CD-ROM, and a DVD-ROM disk. A processor and a memory may be added by a special purpose logic circuit or integrated into the logic circuit.

Implementations of the subject matter described in the specification may be implemented in a calculation system including a back-end component such as a data server, a middleware component such as an application server, a front-end component such as a client computer having a web browser or a graphic user interface which can interact with the implementations of the subject matter described in the specification by the user, or all combinations of one or more of the back-end, middleware, and front-end components. The components of the system can be mutually connected by any type of digital data communication such as a communication network or a medium.

While the specification contains many specific implementation details, these should not be construed as limitations on the scope of any disclosure or of what may be claimed, but rather as descriptions of features that may be specific to particular embodiments of particular disclosures. Certain features that are described in the specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

In addition, in the specification, the operations are illustrated in a specific sequence in the drawings, but it should not be understood that the operations are performed in the shown specific sequence or that all shown operations are performed in order to obtain a preferable result. In a specific case, a multitasking and parallel processing may be preferable. Furthermore, it should not be understood that a separation of the various system components of the above-mentioned implementation is required in all implementations. In addition, it should be understood that the described program components and systems usually may be integrated in a single software package or may be packaged in a multi-software product.

As described above, specific terms disclosed in the specification do not intend to limit the present disclosure. Therefore, while the present disclosure was described in detail with reference to the above-mentioned examples, a person skilled in the art may modify, change and transform some parts without departing a scope of the present disclosure.

The scope of the present disclosure is defined by the appended claims to be described later, rather than the detailed description. Accordingly, it will be appreciated that all modifications or variations derived from the meaning and scope of the appended claims and their equivalents are included in the range of the present disclosure.

What is claimed is:

1. An apparatus for managing performance of a random number generator, the apparatus comprising:
    an output identification unit configured to, when a light signal radiated from at least one light source is input into an image sensor including two or more pixels and each pixel of the image sensor outputs an output value of the each pixel in response to the light signal input into the image sensor, identify the output value of the each pixel corresponding to a light intensity value of the light signal input into the each pixel;
    a performance analysis unit configured to analyze performance of the each pixel using the output value of the each pixel and a statistical characteristic reference area, wherein the statistical characteristic reference area indicates a preset range determined between a minimum reference value and a maximum reference value such that the statistical characteristic reference area is used to determine whether the output value of the each pixel is included in the preset range of the statistical characteristic reference area; and
    a setting change unit configured to change a setting value for at least one of the light source and the image sensor based on a result of analysis of the performance of the each pixel.

2. The apparatus of claim 1, wherein, when the light source is in an ON state and all or partial output values of the respective two or more pixels are included in the statistical characteristic reference area, the performance analysis unit determines that the performance of the each pixel is stable and generates a first performance analysis result signal, and, when all or partial output values of the respective two or more pixels are not included in the statistical characteristic reference area, determines that the performance of the each pixel is not stable and generates a second performance analysis result signal.

3. The apparatus of claim 2, wherein, when the second performance analysis result signal is generated, the setting change unit changes a first setting value related to control of a light quantity or a light intensity of the light source to stabilize the performance of the each pixel.

4. The apparatus of claim 2, wherein, when the second performance analysis result signal is generated, the setting change unit changes a second setting value related to control of driving of the each pixel within the image sensor to stabilize the performance of the each pixel.

5. The apparatus of claim 2, wherein, when the second performance analysis result signal is generated and uniformity of the light intensity value of the light signal input into the each pixel is not included in a preset uniformity determination reference range, the setting change unit changes a third setting value related to control of a Range Of Interest (ROI) of the image sensor.

6. The apparatus of claim 1, wherein, when the light source is in an OFF state and all or partial output values of the respective two or more pixels are greater than a preset noise determination reference value, the performance analysis unit determines that electrical noise of the each pixel is greater than or equal to a reference value, and the setting change unit changes a fourth setting value related to the electrical noise.

7. The apparatus of claim 1, wherein the statistical characteristic reference area is determined as a range greater than or equal to a preset fluctuation width division reference value among ranges corresponding to a fluctuation width of a light intensity value accumulated in the each pixel for a predetermined amount of time following a Poisson distribution.

8. The apparatus of claim 1, further comprising a monitoring unit configured to monitor quality of the output value output from the each pixel after the setting value is changed.

9. A method of operating an apparatus for managing performance of a random number generator, the method comprising:

identifying, when a light signal radiated from at least one light source is input into an image sensor including two or more pixels and each pixel of the image sensor outputs an output value of the each pixel in response to the light signal input into the image sensor, the output value of the each pixel corresponding to a light intensity value of the light signal input into the each pixel;

analyzing performance of the each pixel using the output value of the each pixel and a preset statistical characteristic reference area, wherein the statistical characteristic reference area indicates a preset range determined between a minimum reference value and a maximum reference value such that the statistical characteristic reference area is used to determine whether the output value of the each pixel is included in the preset range of the statistical characteristic reference area; and changing a setting value for at least one of the light source and the image sensor based on a result of analysis of the performance of the each pixel.

10. The method of claim 9, wherein the setting change step comprises performing at least one of the steps of:

when the light source is in an ON state and all or partial output values of the respective two or more pixels are not included in the statistical characteristic reference area, changing a first setting value related to control of a light quantity or a light intensity of the light source;

changing a second setting value related to control of driving of the each pixel within the image sensor; and changing a third setting value related to control of a Range Of Interest (ROI) of the image sensor.

11. The method of claim 9, wherein the statistical characteristic reference area is determined as a range greater than or equal to a preset fluctuation width division reference value among ranges corresponding to a fluctuation width of a light intensity value accumulated in the each pixel for a predetermined amount of time following a Poisson distribution.

12. The method of claim 9, further comprising: monitoring quality of the output value output from the each pixel after the setting value is changed.

* * * * *